Jan. 31, 1967 J. R. NOWELL 3,302,034
PULSE PROCESSING CIRCUITS HAVING AUTOMATIC THRESHOLD LEVEL CONTROL
Filed April 24, 1963 2 Sheets-Sheet 1

INVENTOR.
JOHN R. NOWELL
BY Warren F. B. Lindsley
ATTORNEY

INVENTOR.
JOHN R. NOWELL
BY Warren F.B. Lindsley
ATTORNEY

United States Patent Office 3,302,034
Patented Jan. 31, 1967

3,302,034

PULSE PROCESSING CIRCUITS HAVING AUTOMATIC THRESHOLD LEVEL CONTROL

John R. Nowell, Phoenix, Ariz., assignor to General Electric Company, a corporation of New York Filed Apr. 24, 1963, Ser. No. 275,346
7 Claims. (Cl. 307—88.5)

This invention relates to pulse processing circuits and more particularly to electronic switching devices and circuits having automatic threshold level control.

The use of pulses and trains of pulses for signaling equipment such as that employed in computer applications where the pulses are representative of specific bits of information requires that these pulses have reliable characteristics. These reliable characteristics include rise and decay times that are short in relation to the pulse width and an amplitude that is constant.

In many computer applications information is photoelectrically sensed from intelligence placed on data bearing cards, tapes, and sheets and electrically translated to computing equipment where it is used in electronic computations. Equipment known as card readers are used for photoelectrically sensing the intelligence from the cards, tapes, or sheets as they pass between a photoelectric reading head and a source of light. These photoelectric reading heads, which may comprise one or more photoelectric cells or phototransistors, detect the presence or absence of holes in each location on the intelligence bearing medium. The pattern of light and dark falling on the photoelectric reading head develops a voltage or current wave at the output of the reading head which is intended to be a replica of the pattern of holes and web configuration of the intelligence bearing medium being read.

As a hole in the intelligence bearing medium moves between the light source and the reading head, light falls upon the light sensing means of the reading head. The intensity of this light varies gradually from a low to a high and back to a low value. This occurs because as the hole in the intelligence bearing medium first starts to move between the light source and the reading head, light falls on only a part of the light sensitive surface of the reading head. As the hole in the card moves directly between the light source and the reading head, light falls on the entire light sensitive surface of the reading head. Further movement of the hole past the reading head produces a reduced amount of light falling on the reading head. The resulting output of the reading head accordingly also varies gradually from a low voltage or current to a high voltage or current and back again to a low voltage or current value. Thus, it is noted that the waveform generated does not instantly change from one given level to another given level in response to a hole web pattern on the intelligence bearing medium but gradually changes from one level to another level. This gradual changing voltage or current condition lacks the reliability needed in computer operation. The aging characteristics of the light sources, photoelectric sensitive devices and associated electrical circuit components vary the output voltage or current values of the reading head still further and change the characteristics of the information bearing pulses.

Accordingly, pulse producing devices and circuits are needed which will read intelligence from information bearing mediums and produce pulses representing this information which will have reliable characteristics under substantially all operating conditions.

It is therefore one object of this invention to provide a new and improved electronic switching device.

Another object of this invention is to provide a new and improved electronic switching device employing an automatic threshold level control.

A further object of this invention is to provide a new and improved pulse processing circuit employing an electronic switching device which establishes its own threshold level in accordance with the amplitude of the pulses received.

Other objects and advantages of this invention will become apparent from the following description when taken in connection with the accompanying drawing.

In acordance with the invention claimed, a new and improved pulse processing circuit and device is provided for producing predetermined shaped output pulses. The circuit and device employs an energy storage means such as, for example, a capacitor having a discharge time at least several times greater than the period between the pulses received. An electronically controlled switching means having a plurality of electrodes is arranged for receiving at one of its electrodes the input signal pulses. Another one of the electrodes of the switching means is connected to one side of the energy storage means to create a voltage therein proportional to the amplitude of input signal pulses. The other side of the energy storage means is connected to a reference potential. A second electronically controlled switching means is arranged for connecting the energy storage means to one of the electrodes of the first switching means to establish the level at which the first switching means conducts.

Figures 1, 2:
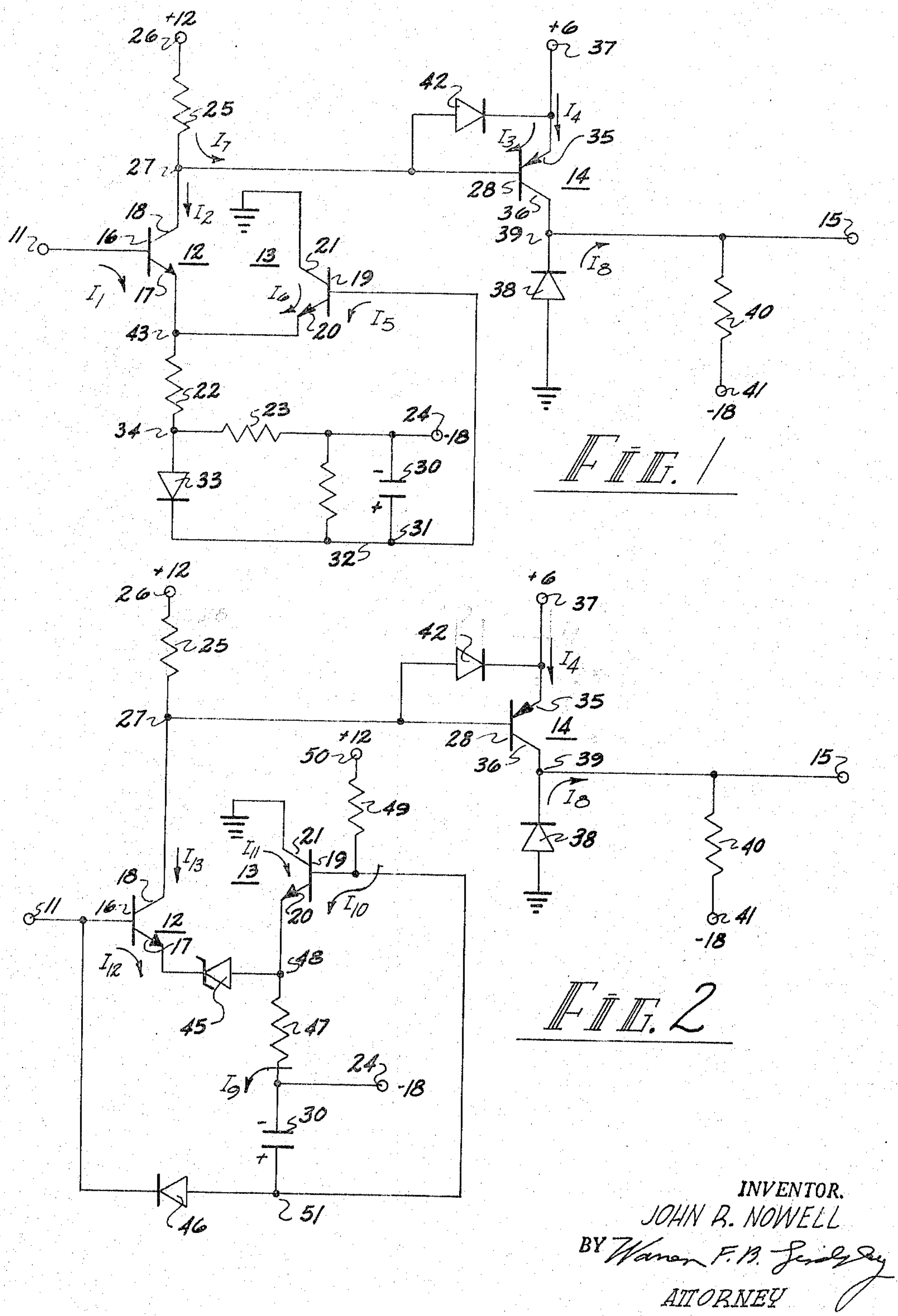
FIG. 1 is a schematic diagram of a pulse processing circuit employing an electronically controlled switching means the threshold level of which is determined by the highest amplitude which the input signal attains and embodying the invention.
FIG. 2 is a modification of the circuit shown in FIG. 1 wherein the bias level of the electronically controlled switching means is determined by the lowest amplitude which the input signal attains.

Referring more particularly to the drawing by characters of reference, FIG. 1 discloses a pulse processing circuit for the controllable transfer of signal pulses from an input terminal 11 through a pair of electronically controlled switching means 12 and 13 and a clipping amplifier 14 to an output terminal 15. Switching means 12 and 13 may comprise a pair of semiconductors such as NPN transistors having current control or base electrodes 16, 19 and output electrodes comprising emitter electrodes 17, 20 and collector electrodes 18 and 21, respectively. The transistor forming switching means 13 is connected in an emitter follower configuration with the transistor forming switching means 12.

Input terminal 11 may be connected to any source of signal pulses but is particularly provided for connection to a reading head of a card reader which photoelectrically senses intelligence placed on information bearing mediums such as cards, tapes and sheets. As explained above, the signals received by terminal 11 and applied to base 16 of switching means 12 comprise waves or pulses having varying amplitudes. If the signals are received from the light sensitive means of a reading head (not shown) as it senses photoelectrically intelligence in the form of holes or slots applied to cards, tapes, sheets or the like passing between the reading head and a source of light, the output of the reading head will vary. The waveform developed by the reading head as it reads the intelligence on the information bearing medium is intended to be a replica of the hole web configuration of the intelligence bearing medium being read. In order for this to occur, the output wave generated should change instantly from one given level to another in response to the hole web configuration. Since this does not occur for the reasons stated above, the claimed structure has been provided to compensate for this discrepancy.

The switching means 12 is arranged to be in a conductive condition before the information bearing mediums, such as cards pass between the reading head of a card reader and its light source. This condition is desirable since an energy storage means such as capacitor 30 is thereby charged prior to a card reading operation. In order to properly bias the transistor of switching means 12 for this condition, emitter electrode 17 is coupled through a pair of resistors 22 and 23 forming a voltage divider to a terminal 24 connected to a minus 18 volt source. The collector electrode 18 of transistor 12 is coupled through a resistor 25 to terminal 26 connected to a plus 12 volt source and from node 27 to the base electrode 28 of clipping amplifier 14.

An energy storage device which may comprise, for example, a capacitor 30 is coupled between terminal 24 and node 31 on conductor 32. Capacitor 30 is arranged to have a discharge time at least several times greater than the period between pulses received at terminal 11. Conductor 32 connects base electrode 19 of the transistor forming switching means 13 through a diode 33 to node 34. Node 34 is arranged at a point between the series connection of resistors 22 and 23.

The clipping amplifier 14 comprises a transistor having a base electrode 28, emitter electrode 35 and collector electrode 36. The emitter electrode 35 is connected to terminal 37 which is connected to a plus 6 volt source while the collector electrode 36 is connected through a clamping diode 38 to ground and at node 39 to output terminal 15. A current path is provided from ground through clamping diode 38 and resistor 40 to terminal 41 which is connected to a minus 18 volt source . Diode 38 clamps the output voltage of terminal 15 at ground potential when the transistor of clipping amplifier 14 is rendered non-conductive and allows the output voltage to rise to a plus 6 volts when the transistor is rendered conductive. A diode 42 shunts the base emitter electrodes of transistor 14 and prevents the base electrode 28 of the transistor of amplifier 14 from rising in potential above approximately 6.7 volts which is the source voltage at terminal 37 plus the voltage drop of diode 42. Diode 42 is used only if the voltage between base and emitter electrodes 28 and 35, respectively, might reach a value high enough to damage the transistor of amplifier 14.

A maximum amplitude pulse such as, for example, a voltage pulse will be received at terminal 11 when the light sensitive device of the reading head is exposed to the light source directly or through a hole in the information bearing medium. At this time base electrode 16 of the transistor forming switching means 12 will be rendered sufficiently positive with respect to its emitter electrode 17 to render transistor 12 conductive. A current $I_1$ will then flow from terminal 11 through the base and emitter electrodes 16 and 17 of transistor 12 and resistor 22 to node 34 where it divides with part of it flowing through resistor 23 to terminal 24 and part of it flowing through diode 33 and capacitor 30 to terminal 24. A second current $I_2$ will also flow from terminal 26 through resistor 25, collector and emitter electrodes 18 and 17 of transistor 12 to node 34 where it also divides with part of it flowing through resistor 23 to terminal 24 and part of it flowing through diode 33 and capacitor 30 to terminal 24.

When the transistor of switching means 12 is rendered conductive, the voltage at node 27 drops below the plus 6 volt value of terminal 37, thereby rendering the base electrode 28 of the transistor of amplifier 14 sufficiently negative with respect to its emitter electrode 35 to render the transistor of amplifier 14 conductive. Rendering the transistor of amplifier 14 conductive causes a third current $I_3$ to flow from terminal 37 through the emitter and base electrodes 35 and 28 of the transistor of amplifier 14, collector and emitter electrodes 18 and 17 of the transistor of switching means 12 and resistor 22 to node 34 where it divides and joins current $I_1$ and $I_2$ in flowing to terminal 24 via resistor 23, diode 33 and capacitor 30. Capacitor 30 will be charged by currents $I_1$, $I_2$ and $I_3$ to a voltage which will be determined by the maximum value of the input voltage at terminal 11 and by the values of resistors 22 and 23 and the potential at terminal 24. In a typical example, in which the maximum peak value of the input wave at terminal 11 may be about a minus 3 volts, capacitor 30 will be charged to approximately 9 volts by currents $I_1$, $I_2$ and $I_3$ which flow during at least a portion of the time when the input wave at terminal 11 is above the threshold value shown in FIG. 4.

When the transistor of amplifier 14 is rendered conductive, a further current $I_4$ flows from terminal 37 through emitter and collector electrodes 35 and 36 and resistor 40 to terminal 41, thereby raising the output terminal 15 to approximately a plus 6 volts.

Figure 4:
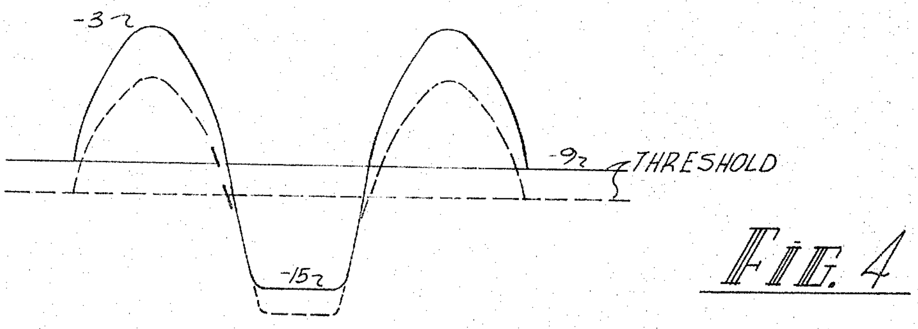
FIG. 4 is a graphic representation of the voltage or current waveform at the input terminals of the circuits shown in FIGS. 1, 2 and 3.

When the web of a card passes between the light source and the reading head of a card reader (not shown), the voltage amplitude of the signal wave drops to its lowest value which is shown as a minus 15 volts in the solid line waveform of FIG. 4. The voltage at terminal 11 at this time drops below the value of the voltage at node 31 which node voltage resulted from the previous high voltage level of terminal 11.

The voltage across capacitor 30 renders base electrode 19 of the transistor forming the switching means 13 more positive than its emitter electrode 20, thereby rendering switching means 13 conductive. Rendering switching means 13 conductive causes a current $I_5$ to flow from the positive terminal of capacitor 30 to node 31 and the closed loop circuit comprising base and emitter electrodes 19 and 20 of switching means 13, resistors 22 and 23 to the negative terminal of capacitor 30. A further curent $I_6$ flow from ground through the collector and emitter electrodes 21 and 20 of switching means 13, resistors 22 and 23 to terminal 24, thereby holding node 43 adjacent emitter 17 of switching means 12 at approximately the same voltage potential as was present when switching means 12 was rendered conductive.

At this time terminal 11 is at its most negative potential since a web of a card is now passing between the light source and the reading head. Base electrode 16 of switching means 12 will now have a more negative potential than its emitter electrode 17, thereby rendering switching means 12 nonconductive. When switching means 12 is rendered non-conductive, the voltage at node 27 rises. A current will now flow from terminal 26 through resistor 25, diode 42 to terminal 37, thereby holding base electrode 28 of the transistor of amplifier 14 more positive than its emitter electrode 35, thereby rendering the transistor of amplifier 14 non-conductive. A further current $I_8$ then flows from ground through clamping diode 38 and resistor 40 to terminal 41, thereby holding the voltage at the output terminal 15 at ground potential.

FIG. 2 illustrates a modification of the circuit shown in FIG. 1 wherein like parts have similar reference characters. The circuit shown in FIG. 2 differs from the circuit shown in FIG. 1 only in the manner in which the bias is obtained and applied to the base emitter electrodes of the transistor forming switching means 12. Resistors 22, 23 and diode 33 of FIG. 1 have been replaced with a network comprising a zener diode 45 connected between emitter electrodes 17 and 20 of switching means 12 and 13. The positive terminal of capacitor 30 is conneceted through a diode 46 to the base electrode 16 of switching means 12 as shown. A resistor 47 connects terminal 24 and the negative terminal of capacitor 30 to node 48 interconnecting emitter electrode 20 of switching means 13 and zener diode 45. The base electrode 19 of switching means 13 is also connected through a resistor 49 to terminal 50 which is connected to a plus 12 volt source.

In the structure shown in FIG. 2, the most negative portion of the input signal at terminal 11 determines the charge on capacitor 30. At the time of the most negative point on the input signal, several important currents are flowing in the circuit shown. A current $I_9$ flows from terminal 24 through capacitor 30, diode 46 to input terminal 11, thereby establishing a charge on capacitor 30. Another curent $I_{10}$ flows from terminal 50 through resistor 49, base and emitter electrodes 19, 20 of switching means 13, resistor 47 to terminal 24, thereby rendering the transistor comprising switching means 13 conductive. A further current $I_{11}$ flows from ground through the collector and emitter electrodes 21, 20 of the transistor forming switching means 13, resistor 47 to terminal 24, thereby holding node 48 at approximately the same voltage as node 51.

The transistor comprising switching means 12 will be maintained non-conductive by the input signal until its base electrode 16 is rendered more positive than the voltage at node 48 plus the breakdown voltage of zener diode 45. The voltage on capacitor 30 will be approximately equal to the smallest voltage potential between terminals 11 and 24. With the solid line wave form shown in FIG. 4, capacitor 30 will have a voltage of approximately 3 volts.

When the input voltage at terminal 11 in FIG. 2 rises above the average or threshold value, shown in FIG. 4 as being a minus 9 volts, the transistor forming switching means 12 is rendered conductive. A current $I_{12}$ then flows from terminal 11 through base and emitter electrodes 16 and 17 of switching means 12, zener diode 45 and resistor 47 to terminal 24, thereby rendering the transistor forming the switching means 12 conductive. Upon switching means 12 being rendered conductive, a current $I_{13}$ will flow from terminal 26 through resistor 25, collector and emitter electrodes 18 and 17 of switching means 12, zener diode 45 and resistor 47 to terminal 24, thereby rendering the transistor forming the switching means 13 nonconductive.

The rendering of the transistor forming the switching means 12 conductive causes the voltage potential at node 27 to drop below the plus 6 volt potential of terminal 37, thereby rendering clipping amplifier 14 conductive. Rendering clipping amplifier 14 conductive provides a plus 6 volt potential at output terminal 15 in the same manner as discussed under FIG. 1. If the input wave shown in FIG. 4 were to change from the solid line to the dashed line configuration, the threshold value of switching means 12 would also change from the solid line to the dashed line value.

Figure 3:
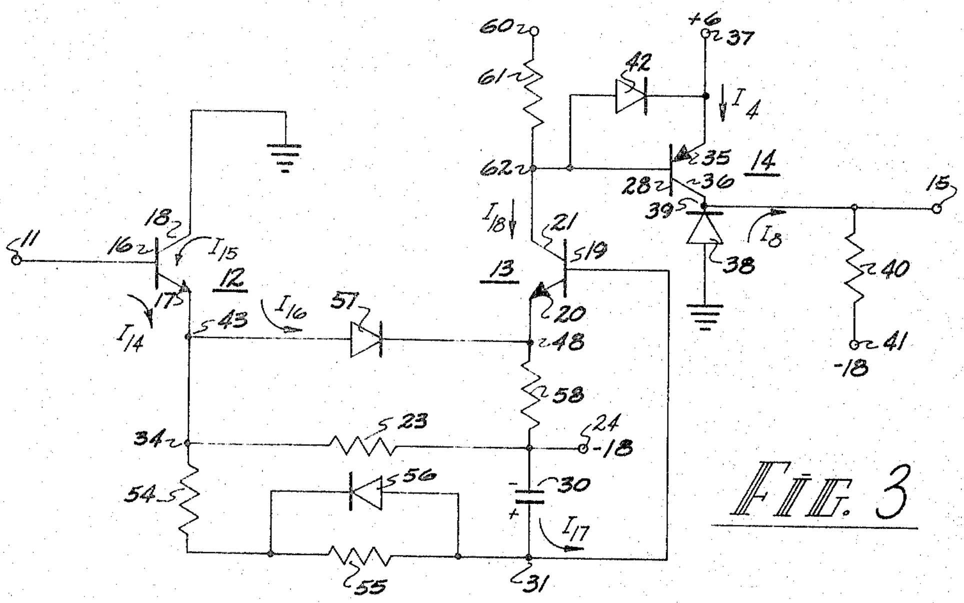
FIG. 3 is a further modification of the circuit shown in FIG. 1 wherein the bias level of the electronically controlled switching means is determined by the average value of the input signal.

FIG. 3 illustrates a further modification of the circuits shown in FIGS. 1 and 2 wherein like parts have similar reference characters. FIG. 3 essentially differs from the circuits shown in FIGS. 1 and 2 in the manner in which the bias is obtained and applied to the base emitter electrodes of the transistor forming switching means 12. Resistor 22 of FIG. 1 has been omitted from FIG. 3 and a network comprising resistors 54 and 55 and diode 56 is connected between nodes 31 and 34 as shown. The collector or output electrode of switching means 13 is connected to the base electrode 28 of amplifier 14.

In FIG. 3 the average value of the input signal at terminal 11 determines the charge on capacitor 30. The portion of the input signal which is above the average value of the signal pulses will cause capacitor 30 to charge while the portion of the input signal which is below the average value will result in a partial discharge of capactor 30.

When the potential of terminal 11 exceeds the average value of the input wave, a current $I_{14}$ will flow from the input terminal through the base and emitter electrodes of the transistor forming switching means 12 to node 34 where it divides with one part flowing through resistor 23 to terminal 24 and the other part flowing through resistors 54 and 55, capacitor 30 to terminal 24. This current flow renders the transistor of switch means 12 conductive causing a current $I_{15}$ to flow from ground through the collecotor and emitter electrodes 18 and 17 of switching means 12 to node 34 where it divides with part flowing through resistor 23 to terminal 24 and part flowing through resistors 54 and 55, diode 56 and capacitor 30 to terminal 24. A further current $I_{16}$ flows from ground through the collector and emitter electrodes 18 and 17 of switching means 12, diode 57, resistor 58 to terminal 24, thereby raising the voltage at node 48 and rendering the transistor of switching means 13 non-conductive. When switching means 13 is non-conductive, amplifier 14 will be non-conductive and current $I_8$ will flow from ground through clamping diode 38 and resistor 40 to terminal 41, thereby holding the voltage at the output termina 15 at ground potential.

When the input voltage at terminal 11 in FIG. 3 drops below the average value of the input signal wave, the voltage at nodes 43 and 48 will be below the average value of the input signal thereby causing a current $I_{17}$ to flow from the positive terminal of capacitor 30 through the base and emitter electrodes 19 and 20 of the transistor forming switching means 13 and resistor 58 to the negative terminal of capacitor 30. This current flow renders the transistor of switching means 13 conductive. Upon switching means 13 being rendered conductive, a current $I_{18}$ will flow from terminal 60 through resistor 61, collector and emitter electrodes 21 and 20 of the transistor forming switching means 13, resistor 58 to terminal 24, thereby raising the potential of nodes 43 and 48 and rendering the transistor forming switching means 12 non-conductive.

Rendering the transistor of switching means 13 conductive causes the voltage at node 62 to drop below the plus 6 volt potential of terminal 37, thereby rendering the transistor of amplifier 14 conductive providing a plus 6 volt potential at the output terminal 15 in the same manner as was done in FIG. 1.

Figure 5:
FIG. 5 is a graphic representation of the voltage waveform at the output terminals of the circuits shown in FIGS. 1, 2 and 3.

FIG. 5 illustrates a graphic representation of the voltage waveform at the output terminal 15 of the circuits shown in FIGS. 1, 2 and 3.

In summary, it should be noted that the circuits shown in FIGS. 1, 2 and 3 compensate for the variation of intensity of the light source due to the aging of the lump and circuit components in the photoelectric sensing circuits. As the lamp and other components in the photoelectric sensing circuit deteriorate with age, the voltage or current amplitude of the output of the sensing device which is the input to terminal 11 in FIGS. 1, 2 and 3 decreases to values below its original peak output value. The initial voltage or current output waveform is shown in full lines in FIG. 4 and the dashed line illustrates a voltage or current waveform which may occur later due to aging of the circuit components. Capacitor 30, serving as the energy storage device in the circuit shown in FIGS. 1, 2 and 3, is charged to a voltage determined by the maximum positive, maximum negative or average value of the input waveform. Since the transistor forming a part of the switching means 12 is biased by the potential of the energy storage means, this transistor will be rendered non-conductive at varying potential values depending upon the potential of capacitor 30.

In the solid line voltage wave illustration of FIG. 4, capacitor 30 will charge to a voltage value determined by the peak value of the wave and the particular resistance values of resistors 22, 23 forming the voltage divider. This voltage value of the charged capacitor plus the voltage at terminal 24 determines the threshold voltage of switching means 12. In the dashed line voltage wave illustration of FIG. 4, capacitor 30 will charge to a voltage value determined by the peak value of this particular wave. The voltage peak value plus the voltage at terminal 24 will result in another threshold voltage of switching means 12. Thus, it can be seen that as the signal amplitude decreases, the threshold voltage of the transistor forming switching means 12 decreases. The transistor forming the switching means 12 will continue to be rendered conductive during approximately the same period of time as when the signal of the potential of the input signal was at its highest value. However, its threshold value will vary depending upon the potential of capacitor 30 forming the energy storage means. By means of the circuits shown in FIGS. 1, 2 and 3, the output voltage waveform at terminal 15 will have a predetermined shape even though the amplitude of the signal at input terminal 11 were to change due to deterioration with age of the components of the photoelectric sensing device.

While the principles of the invention have now been made clear in an illustrative embodiment, there will be immediately obvious to those skilled in the art many modifications of structure, arrangement, proportions, elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

What is claimed is:

1. A switching device whose threshold level is established by input signals from a source of signal pulses comprising an energy storage means having a discharge time several times greater than the period between the pulses received, a first means having a current control electrode and first and second output electrodes, said current control electrode being arranged to receive the pulses, one of said output electrodes being connected to said energy storage means to create a voltage therein proportional to the amplitude of the pulses, first and second terminals for connection to reference potentials, a second means for connecting said storage means to one of said output electrodes to establish the level at which said first means conducts, and means for connecting said first terminal to said energy storage means and said second terminal to the other of said output electrodes.

2. A signal amplifier whose theshold level is established by input signals from a source of signal pulses comprising an energy storage means having a discharge time several times greater than the period between the pulses received, a first semiconductor means having a current control electrode and first and second output electrodes, said current control electrode being arranged to receive the pulses, one of said output electrodes being connected to said energy storage means to create a voltage therein proportional to the amplitude of the pulses, first and second terminals for connection to reference potentials, a second semiconductor means for connecting said storage means to said one of said output electrodes to establish the level at which said first means conducts, and means for connecting said first terminal to said energy storage means and said second terminal to the other of said output electrodes.

3. A signal amplifier whose threshold level is established by input signals from a source of signal pulses comprising an energy storage means having a pair of terminals and having a discharge time several times greater than the period between the pulses received, a transistor having a current control electrode and first and second output electrodes, said current control electrode being arranged to receive the pulses, one of said output electrodes being connected to one of said terminals of said energy storage means to create a voltage therein proportional to the amplitude of the pulses, first and second reference terminals for connection to reference potentials, a second transistor connected in an emitter follower configuration having its base connected to said first terminal of said energy storage means and its emitter connected to said one of said output electrodes to establish the voltage level at which said first transistor conducts, and means for connecting said first reference terminal to the other of said terminals of said energy storage means and said second reference terminal to the other of said output electrodes.

4. A pulse shaping circuit for establishing a threshold level for a signal amplifier comprising a source of signal pulses, an energy storage means having a discharge time several times greater than the period between the pulses received, a first semiconductor means having a current control electrode and first and second output electrodes, said current control electrodes being arranged to receive the pulses, one of said output electrodes being connected to said energy storage means to create a voltage therein proportional to the amplitude of the pulses, first and second reference potentials, a second semiconductor means for connecting said storage means to one of said output electrodes to establish the voltage level at which said first semiconductor means conducts, and means for connecting said first reference potential to said energy storage means and said second reference potential to the other of said output electrodes.

5. A signal amplifier whose threshold level is established by input signals from a source of signal pulses comprising an energy storage means having a discharge time several times greater than the period between the pulses received, a first transistor having a current control electrode and first and second output electrodes, a first terminal means for connecting said current control electrode to said source of pulses, one of said output electrodes being connected to said energy storage means, unidirectional current conducting means for connecting said energy storage means to said first terminal means for creating a voltage in said energy storage means proportional to the amplitude of the pulses received, second and third terminals means for connection to reference potentials, a second transistor for connecting said storage means to said one of said output electrodes to establish the voltage level at which said first transistor conducts, and means for connecting said second terminal to said energy storage means and said third terminal to the other of said output electrodes.

6. A pulse shaping circuit for establishing a threshold level for a signal amplifier comprising a source of signal pulses, an energy storage means having a discharge time several times greater than the period between the pulses received, a first transistor having a current control electrode and first and second output electrodes, said current control electrode being arranged to receive the pulses, one of said output electrodes being connected to said energy storage means to create a voltage therein proportional to the amplitude of the pulses, first and second reference potentials, a second transistor for connecting said storage means to one of said output electrodes to establish the voltage level at which said first transistor conducts, means for connecting said first reference potential to said energy storage means and said second reference potential to the other of said output electrodes, and pulse shaping means connected to said other of said output electrodes for providing a predetermined shaped output pulse.

7. A signal amplifier whose threshold level is established by signals from a source of signal pulses comprising an energy storage means having a discharge time several times greater than the period between the pulses received, a first means having a current control electrode and first and second output electrodes, said current control electrode being arranged to receive the pulses, one of said electrodes being connected to said energy storage means to create a voltage therein proportional to the amplitude of the pulses received, first and second terminals for connection to reference potentials, a second means for establishing the potential of one of said output electrodes of said first means in relationship to the potential of said energy storage means, said second means comprising a transistor arranged in an emitter follower configuration having its emitter connected to said one of said output electrodes of said first means and its base connected to said energy storage means, said second means establishing the voltage level at which said first means conducts, and means for connecting said first terminal to said other of said output electrodes and said second terminal to said energy storage means.

References Cited by the Examiner

UNITED STATES PATENTS

| | | | |
|---|---|---|---|
| 2,985,836 | 5/1961 | Hatton. | |
| 3,025,413 | 3/1962 | Borden | 328—171 X |
| 3,028,558 | 4/1962 | Foglia | 328—151 X |
| 3,060,326 | 10/1962 | Watson | 328—171 X |
| 3,221,182 | 11/1965 | Anderson et al | 328—171 X |

J. JORDAN, *Assistant Examiner.*

ARTHUR GAUSS, *Primary Examiner.*